May 29, 1962 M. W. EHRLICHMANN ET AL 3,036,617
EMERGENCY CHAIN FOR VEHICLE WHEELS
Filed Sept. 30, 1959
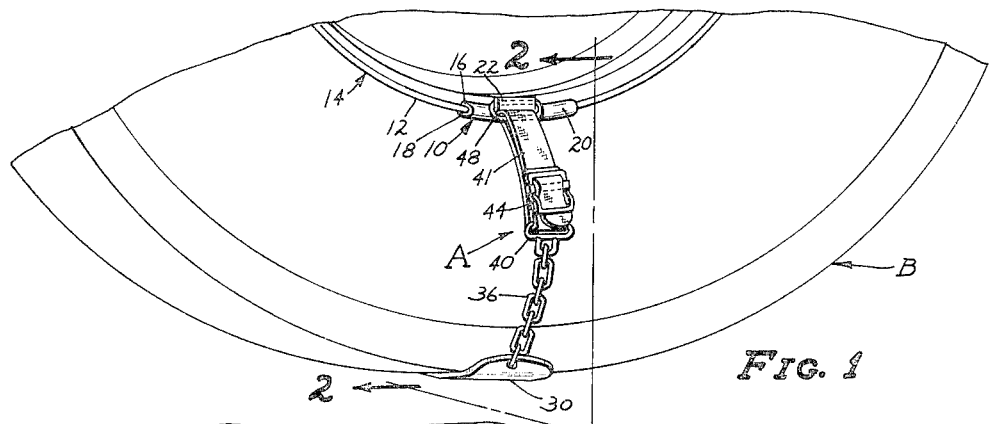
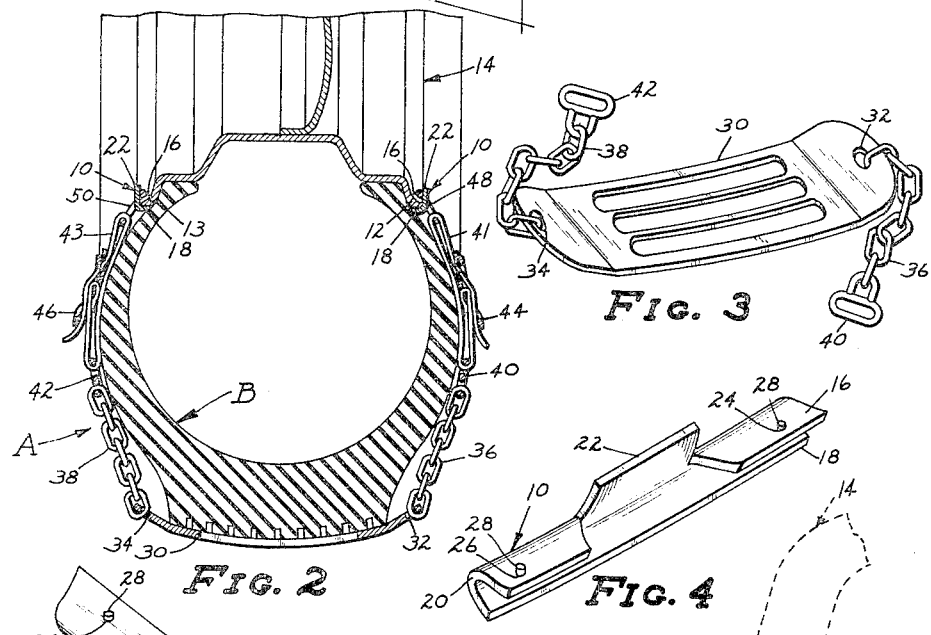
INVENTORS
MERLIN W. EHRLICHMANN
NILES F. EHRLICHMANN
BY
Jack W. Wicks
ATTORNEY 3,036,617
EMERGENCY CHAIN FOR VEHICLE WHEELS
Merlin W. Ehrlichmann, 760 County Road 73, Minneapolis 26, Minn., and Niles F. Ehrlichmann, 4024 65th Ave. N., Minneapolis 22, Minn.
Filed Sept. 30, 1959, Ser. No. 843,384
3 Claims. (Cl. 152—236)

Our invention relates to an improvement in chains for vehicle wheels and more particularly to a single chain unit which may be quickly and easily attached to and removed from a vehicle wheel such as the rim and tire of an automobile particularly for use in an emergency to give temporary added traction.

With the advent of the modern steel automobile wheel having very small and narrow concentric slots at the rim, or no slots at all, it is highly impractical to attempt to mount present day emergency chains on such wheels.

It is an object of our invention to provide an emergency chain unit which may be quickly and easily attached to and removed from the wheel of a vehicle. It is also an object to provide a chain, portions of which are easily and securely mounted on the rim of the conventional wheel and which provide anchoring lugs and to which the securing means for the chain is connected.

We will not here attempt to set forth and indicate all of the various objects and advantages incident to our invention, but other objects and advantages will be referred to in or else will become apparent from that which follows.

The invention will appear more clearly from the following detailed description when taken in connection with the accompanying drawings, showing by way of example a preferred embodiment of the inventive idea where like numerals refer to like parts throughout.

In the drawings forming part of this application:

FIGURE 1 is a perspective view of our chain mounted on a wheel, only a portion of the tire and rim being shown.

FIGURE 2 is a sectional view on the line 2—2 of FIGURE 1.

FIGURE 3 is a perspective view of the tread plate and connecting chain portions.

FIGURE 4 is a perspective view of one of the connector lug members which mounts on the edge of the wheel rim.

FIGURE 5 is a further perspective view of the connector lug member illustrated in FIGURE 4.

FIGURE 6 is a sectional view on the line 6—6 of FIGURE 5 and a portion of the wheel rim in broken lines.

Referring to the drawings in detail my chain A includes the connector lugs 10 one of which is secured to the outer edge 12 of the rim 14 and another is secured to inner edge 13 of the rim 14 directly opposed to the first mentioned connector lug. The connector lug 10 is substantially a U-shaped channel formation and includes the elongated upper and lower lip portions 16 and 18 respectively, joined at 20 to form the U-shaped channel construction. Upper and lower lip portions 16 and 18 may also be referred to as radially inner and outer portions 16 and 18 respectively. The upper lip portion 16 has formed thereon the lug portion 22 which extends from the inner edge of the lip adjacent the juncture 20. The upper lip portion 16 is also formed with the threaded holes 24 and 26 adapted to receive an "Allen" screw 28. The longitudinal axis of the connector lug 10 is substantially that of the curve of the outer edge of the rim 14, and the space between the upper and lower lip portions 16 and 18, respectively, approximates the cross sectional area of the edge of the rim. The connector lug 10 is secured to the edge of the rim 14 by placing the connector lug 10 on the rim with the edge 13, for example, within the channel portion, particularly FIGURE 6, with the lip portion 16 disposed upwardly, and then tightening the screws 28 downwardly against the wheel rim edge 13. As a result the connector lug is clamped in secure position on the wheel rim 14. As can be seen from FIGURES 1, 2 and 6, it is not necessary to deflate the tire to mount lugs 10 on rim 14 as lip portions 16 and 18 thereof do not extend between the wall of the tire and rim 14. A further connector lug 10 is secured to the wheel rim at a point directly opposed on the other side of the wheel. With the connector lugs in place on the inside and outside of the rim 14, we have two upstanding lugs 22 for engagement with the straps hereinafter mentioned.

The numeral 30 designates a ground engaging tread member which contacts the crown of the tire b which is formed with the holes 32 and 34 on the ends thereof. Secured through the holes 32 and 34 are the short chain sections 36 and 38 respectively formed with the metal loops 40 and 42 respectively. Further provided are the identical take-up belt loops 41 and 43 formed with the adjustable take-up buckles 44 and 46, respectively. The belts 41 and 43 have positioned on the outer ends thereof the metal loops 48 and 50, respectively.

In securing our chain A on the wheel rim 14 the loop 50, for example, in FIGURE 2, is slipped onto the lug 22 of a connector lug 10 secured on the inside of the wheel rim with the buckle 46 adjusted so that the tread member 30 is disposed centrally on the crown of the tire B. Then the loop 48 is slipped onto the lug 22 of the connector 10 secured on the outside of the wheel rim as outlined above. Then the buckle 44 is tightened to securely mount the chain A on the tire B. Several pairs of connector lugs 10 may be similarly mounted in spaced relation on the rim 14 and treads 30 connected thereto as set forth where greater traction is desired. The tread members 30 may be metal, plastic, rubber, chain, etc., and the connection between the tread 30 and the lugs 22 may be a single piece of belt, chain, cable or the like with take-up means.

The invention is not to be understood as restricted to the details set forth since these may be modified within the scope of the appended claims without departing from the spirit and scope of the invention.

Having thus described the invention, what I claim as new and desire to secure by Letters Patent is:

1. In an emergency chain for the wheel of a vehicle, a pair of elongated curved connector lugs clampingly engageable with the inner and outer rim flanges of a wheel respectively, each of said connector lugs being curved longitudinally in correspondence with the rim flange curvature and engaging the rim flange along a relatively small circumferential portion thereof, threaded means in said connector lugs engageable with small circumferential portions of the radial surface of the rim flanges, a lug portion extending radially inwardly from each of said connector lugs, a ground engaging tread member, and means for releasably connecting said tread member to said lug portions of said connector lugs.

2. An emergency chain structure consisting of a pair of one piece elongated generally arcuate connector lugs clampingly engageable with the inner and outer rim flanges of a wheel respectively, said connector lugs being curved along the longitudinal axes thereof so as to clampingly engage throughout their length the curved edges of said rim flanges, said connector lugs contacting said rim flanges along relatively small circumferential portions thereof, threaded means in said connector lugs for anchoring said connector lugs to said rim flanges, a central lug portion struck radially inwardly from each of said connector lugs, a ground engaging tread member, and means for releasably connecting said tread member to said lug portions of said connector lugs.

3. In an emergency chain device for the wheel and pneumatic tire of a vehicle, a pair of generally elongated arcuate connector lugs clamping engageable with the curved inner and outer rim flanges of a wheel respectively, said connector lugs engaging the rim flanges along a relatively small circumferential portion thereof without disturbing the air seal between the tire and the wheel, means for removably attaching said connector lugs to said wheel, a lug portion integral with and extending radially inwardly from each of said connector lugs, a ground engaging tread member, and means for connecting said tread member to said lug portions of said connector lugs.

References Cited in the file of this patent

UNITED STATES PATENTS

| | | |
|---|---|---|
| 2,171,592 | Nagle | Sept. 5, 1939 |
| 2,204,886 | Devlin | June 18, 1940 |
| 2,644,503 | Paske | July 7, 1953 |
| 2,664,133 | Eger | Dec. 29, 1953 |
| 2,731,059 | Ford | Jan. 17, 1956 |
| 2,778,400 | Charlton | Jan. 22, 1957 |